Oct. 31, 1939.   R. P. HEUER   2,177,716
DESULPHURIZING APPARATUS
Filed Oct. 29, 1937   3 Sheets-Sheet 1
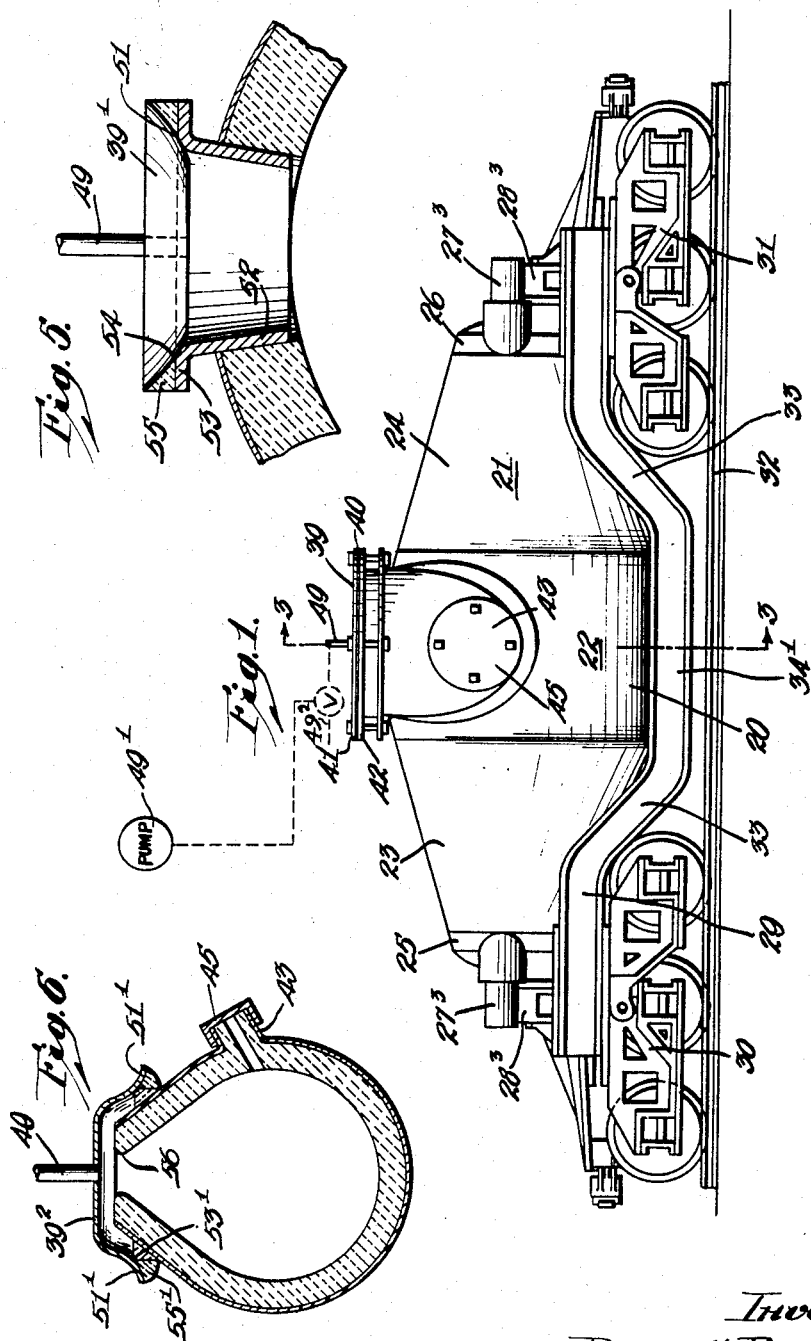
Inventor
Russell Pearce Heuer Oct. 31, 1939. R. P. HEUER 2,177,716
DESULPHURIZING APPARATUS
Filed Oct. 29, 1937 3 Sheets-Sheet 2
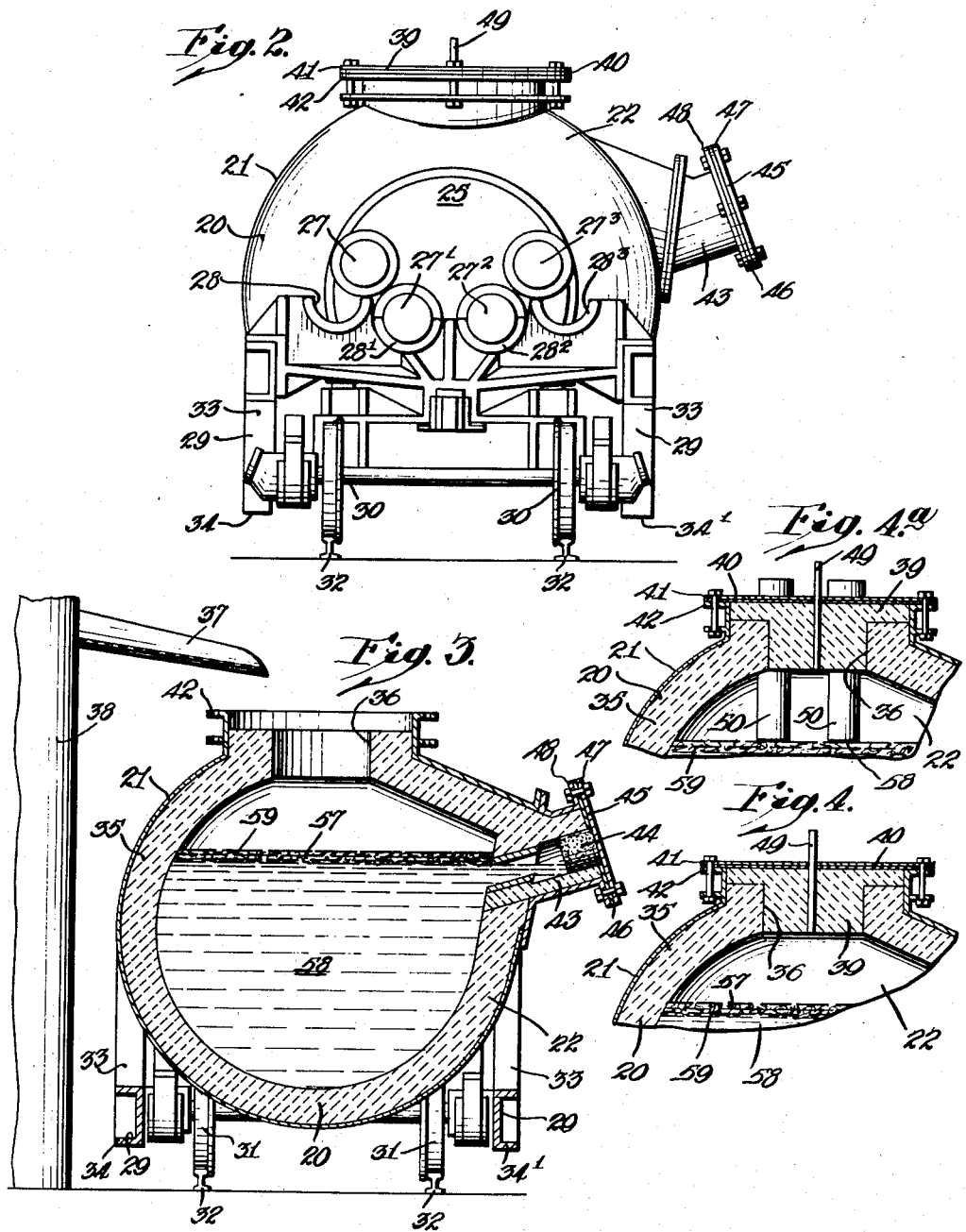
Inventor
Russell Pearce Heuer Oct. 31, 1939. R. P. HEUER 2,177,716
DESULPHURIZING APPARATUS
Filed Oct. 29, 1937 3 Sheets-Sheet 3

Inventor
Russell Pearce Heuer

UNITED STATES PATENT OFFICE 2,177,716

DESULPHURIZING APPARATUS

Russell Pearce Heuer, Bryn Mawr, Pa.

Application October 29, 1937, Serial No. 171,800

5 Claims. (Cl. 266—34)

The invention relates to apparatus for the manufacture of pig iron and the production of steel, and particularly to the desulphurization of pig iron. This application is a continuation in part of my applications Serial No. 20,555, filed May 9, 1935, for Iron and steel desulphurization, Patent No. 2,110,066, granted March 1, 1938; Serial No. 96,743, filed August 19, 1936, for Iron desulphurization, Patent No. 2,110,067 granted March 1, 1938; and Serial No. 123,423, filed February 1, 1937, for Iron desulphurization, and contains apparatus claims from these applications.

A purpose of the invention is to operate a coke blast furnace to produce pig iron higher in sulphur than that ultimately desired, and preferably at a lower cost than normal, by operating the blast furnace at a lower temperature and/or with less basic slag and/or with low grade raw materials causing higher sulphur in the charge, and to provide apparatus in which to treat the molten pig iron thus produced with a basic slag external to the blast furnace hearth, to remove the excess sulphur from the molten pig iron. The pig iron thus produced may be used in the form of cast iron or as raw material for making steel.

A further purpose is to exclude air from the ladle containing the desulphurizing slag and pig iron during desulphurization by a gas, preferably nitrogen, whose oxygen activity is substantially lower than that of the reaction at atmospheric pressure between carbon and oxygen to form carbon monoxide under equilibrium conditions at the pig iron temperature, suitably less than $8.2 \times 10^{-9}$.

A further purpose is to agitate molten pig iron during desulphurizing treatment with a basic slag under reducing conditions and with the exclusion of oxidizing substances while subjecting the pig iron and slag to a pressure less than normal atmospheric pressure.

A further purpose is to desulphurize molten pig iron excessively high in sulphur by treating it in a closed vessel with a basic desulphurizing slag under a pressure less than normal atmospheric pressure.

A further purpose is to build up a higher ratio between the sulphur in the slag and the sulphur in the pig iron than would be obtained with the same slag under atmospheric pressure.

A further purpose is to desulphurize by a slag which would not be desulphurizing at the same temperature under atmospheric pressure.

A further purpose is to provide apparatus to desulphurize an iron bath under vacuum conditions and in the presence of a slag and to subsequently protect against resulphurization of the bath during removal of the slag by filling the space above the bath by a noncontaminating gas at atmospheric pressure.

A further purpose is to prevent resulphurization of a bath of molten iron which has been freed from sulphur under vacuum conditions, by filling the vacuum space with gas free from contamination by oxygen, carbon dioxide, carbon monoxide and water vapor.

A further purpose is to withdraw molten pig iron and molten blast furnace slag from the blast furnace and to desulphurize the molten pig iron by the molten blast furnace slag under reducing conditions in a vessel maintained at a pressure below normal atmospheric pressure by a vacuum pump or the like.

A further purpose is to desulphurize molten pig iron by blast furnace slag which has been mixed with a suitable quantity of fluorspar and desirably also with lime, conducting desulphurization in the presence of carbon, or in the presence of some other reducing agent, such as a metallic reducing agent, for example metallic aluminum. Where carbon is used, the carbon may in some cases be supplied by the carbon in the pig iron, although preferably the reaction should be carried out in a carbon lining, desirably in the presence of added loose carbon.

A further purpose is to provide apparatus to desulphurize molten pig iron by a basic slag preferably containing lime, in the presence of a metallic reducing agent capable of maintaining the required low oxygen activity, excluding air by a gas having a suitably low oxygen activity, for example, nitrogen. Metallic aluminum is the preferred metallic reducing agent, although metallic magnesium or metallic calcium may be used.

A further purpose is to provide apparatus to desulphurize molten pig iron outside the blast furnace with a lime slag and metallic aluminum, excluding air, desirably by a suitable protecting gas.

A further purpose is to desulphurize molten pig iron by a slag in an enclosed vessel provided with means to maintain the pig iron and slag under a pressure less than normal atmospheric pressure and desirably provided with means for agitating the molten contents of the vessel.

Further purposes appear in the specification and in the claims.

The present application incorporates by reference my United States patent applications, Serial No. 20,555, filed May 9, 1935, for Iron and steel desulphurization, Patent No. 2,110,066, granted March 1, 1938; Serial No. 96,743, filed August 19, 1936, for Iron desulphurization, Patent No. 2,110,067, granted March 1, 1938; and Serial No. 123,423, filed February 1, 1937, with the purpose and intent that subjects matter may be transferred from any of these applications to the present application as required. Reference may be had to these patents and this application for disclosure of the process.

The drawings are largely diagrammatic illustrations and all apparatus shown is strictly schematic, no effort having been made to complicate the disclosure by the illustration of detail within the routine skill of those in the art.

Figure 1 is a diagrammatic side elevation of a desulphurizing vessel which may be used in practicing the invention.

Figure 2 is a left end elevation of the structure of Figure 1.

Figure 3 is a transverse section of Figure 1 upon the line 3—3 thereof, with the top opening free for admittance of material and a furnace and runner in place.

Figures 4 and 4a are fragmentary views corresponding to a portion of Figure 4 respectively without and with permissible heating electrodes and showing the opening 36 closed by an airtight cover.

Figures 5 and 6 are sectional views showing variant cover arrangements for the desulphurizing vessel. Figure 5 is merely a fragment.

In the drawings like numerals refer to like parts, and in the specification like symbols refer to like subjects matter.

Figure 7:
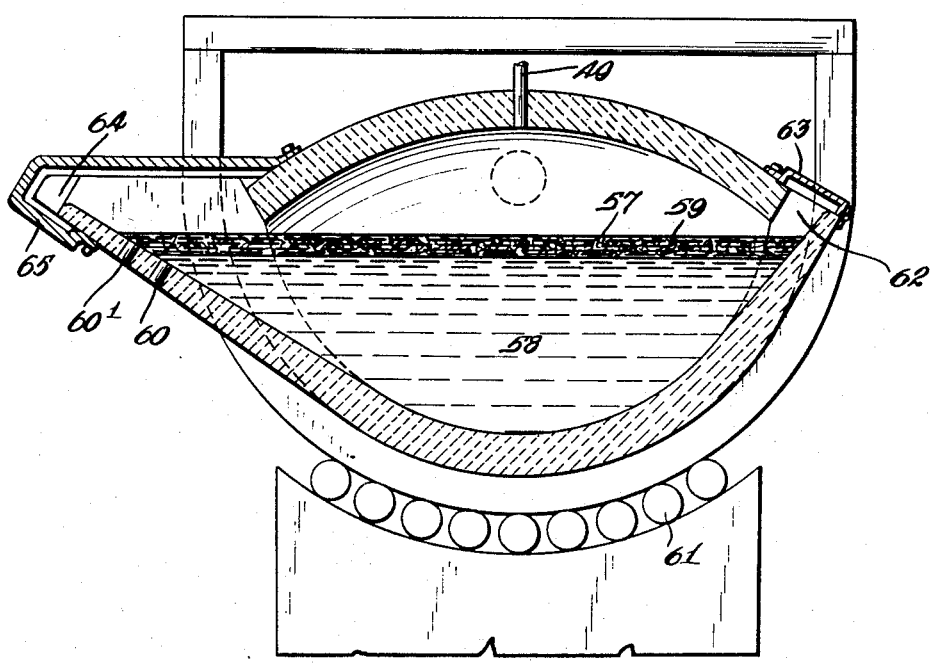
Figure 7 is a diagrammatic section of a mixer which embodies features of the invention.

Throughout the specification, wherever reference is made to pig iron, it is intended to designate the product of the blast furnace which characteristically has a high carbon content, usually of 3% to 4%, or more, and always in excess of 2%, with varying contents of metalloids. The product of the blast furnace is referred to as pig iron whether it is intended to be used in the form of cast iron or whether it is to be used in making steel.

In the production of pig iron by the invention from low-sulphur burdens (such as wood charcoal and low sulphur ores) it is unnecessary to operate the blast furnace in such a manner as to obtain strong desulphurizing conditions in the hearth and bosh of the blast furnace. As a result the operation of the charcoal blast furnace is quite economical except for the excessive costs of charcoal and of low sulphur ores. In most instances, however, because of the high cost of wood charcoal, it is necessary to substitute coke for wood charcoal as a blast furnace fuel. When this is done, a strong desulphurizing action must be obtained in the hearth and bosh of the blast furnace in order to obtain a product having low enough sulphur to be commercially usable. For a strong desulphurizing action, it is necessary to have a higher temperature and a slag containing more lime than for a weaker desulphurization. More fuel must be used in order to provide the higher temperature.

A typical slag from a charcoal blast furnace approximates

|  | Percent |
|---|---|
| SiO$_2$ | 47.0 |
| Al$_2$O$_3$ | 18.0 |
| CaO | 27.0 |
| MgO | 3.0 |
| S | 0.10 |

In the above slag the silica exceeds the lime plus magnesia. The sulphur in the pig iron approximates 0.02%.

A typical slag from a coke blast furnace has the following approximate composition:

|  | Percent |
|---|---|
| SiO$_2$ | 34.0 |
| Al$_2$O$_3$ | 12.0 |
| CaO | 40.0 |
| MgO | 10.0 |
| S | 1.7 |

In the above slag the silica is less than the lime plus magnesia. The sulphur in the pig iron approximates 0.03%.

The temperatures of the slag and pig iron tapped from a charcoal blast furnace are about 1450° C. and 1410° C. respectively. In the coke blast furnace, the respective temperatures of the slag and pig iron as tapped are approximately 1525° C. and 1475° C. Thus it is unnecessary for the charcoal blast furnace to expend as much heat to produce slag and pig iron as does the coke blast furnace.

From the above data it will be obvious that the cost of removing sulphur from the pig iron simultaneously with smelting of the ore in a blast furnace is considerable. It is one purpose of the present invention to cheapen the cost of manufacturing pig iron, whether for use as cast iron or for making steel, by omitting the strong desulphurizing action now considered necessary in the coke blast furnace because of the sulphur-bearing burdens. The smelting is conducted in the coke blast furnace under conditions of temperature and basicity of slag suitable to produce pig iron at lower cost but with a higher sulphur content in the iron than that ultimately desired. The sulphur content in the iron produced may be for example 0.25% sulphur. After production of this high sulphur pig iron, by the invention it is treated in novel apparatus as a wholly independent operation to remove the excess of sulphur. The cost of the desulphurization is small and it is possible to produce pig iron of desirable quality at a considerable saving. Of course it is not necessary that the high sulphur pig iron contain as much as 0.25% sulphur before treatment. The process is equally adapted to the desulphurization of pig iron containing 0.10% sulphur or 0.05% sulphur or less depending upon individual conditions.

The pig iron, containing a higher sulphur content than that ultimately desired, is transferred from the coke blast furnace to a suitable desulphurizing vessel as described later. The pig iron is there subjected to a strongly basic slag under reducing conditions. It is generally considered that the sulphur in pig iron is present as FeS. This iron sulphide will dissociate thus:

$$FeS \rightarrow Fe + \tfrac{1}{2}S_2 \qquad (1)$$

Due to this dissociation, there is a certain activity of sulphur in the molten pig iron which is measured at constant temperature by the equilibrium constant for Equation (1), thus $$\frac{(A_{Fe}) \cdot (A_{S_2})^{1/2}}{(A_{FeS})} = K_1$$

where $(A_{Fe})$ = activity of iron.

$(A_{S_2})$ = activity of sulphur.

$(A_{FeS})$ = activity of iron sulphide.

$K_1$ = equilibrium constant.

The iron sulphide is considered to be present in solution in the molten pig iron and its activity varies as the concentration.

The desulphurizing slag contains basic oxides of the alkaline earth or alkali metals such as calcium oxide, barium oxide, strontium oxide, sodium oxide, etc. These are referred to generally as $R_xO$ oxides, where R is an alkaline earth or alkali metal and $x$ is the numeral 2 or 1, depending upon the valence of the metal. The oxides of the slag tend to react with sulphur of the pig iron thus:

$$R_xO + \tfrac{1}{2}S_2 = R_xS + \tfrac{1}{2}O_2 \qquad (3)$$

For this reaction the equilibrium at constant temperature is expressed thus:

$$\frac{(A_{R_xS}) \cdot (A_{O_2})^{\frac{1}{2}}}{(A_{R_xO}) \cdot (A_{S_2})^{\frac{1}{2}}} = K_2 \qquad (4)$$

where $(A_{R_xO})$ = activity of $R_xO$.

$(A_{R_xS})$ = activity of $R_xS$.

$(A_{O_2})$ = activity of oxygen.

$K_2$ = equilibrium constant.

From reaction (3) it will be evident that there will be a low activity of sulphur and sulphur can be removed from the pig iron to enter the slag most efficiently if there is a low oxygen activity. In other words, the sulphur activity may be lowered directly by lowering the oxygen activity. The desulphurizing slag is therefore caused to act upon the pig iron in the presence of a reducing agent, as for example an excess of carbon. The carbon produces a low oxygen activity according to the reaction:

$$C + \tfrac{1}{2}O_2 \rightarrow CO \qquad (5)$$

The equilibrium expression for this reaction is $$\frac{(A_{CO})}{(A_C) \cdot (A_{O_2})^{\frac{1}{2}}} = K_3 \qquad (6)$$

where $(A_C)$ = activity of carbon.
$(A_{CO})$ = activity of carbon monoxide.
$K_3$ = equilibrium constant.

The equilibrium constant $K_3$ may be calculated from the Gibbs free energy of reaction (5) by the equation:

$$-\Delta F_0 = RT \ln K_3 \qquad (7)$$

where $-\Delta F_0$ = free energy change.
R = gas constant.
T = absolute temperature.
$\ln$ = logarithm to the base $e$.

The free energy change at a given temperature is expressed by the following equation, taken from International Critical Tables, Volume VII, page 243:

$$\Delta F_0 = -26{,}600 - 2.15 T \ln T + 0.00215 T^2 - 0.0000002\ T^3 - 8.20\ T \qquad (8)$$

At 1673° K. (1400° C.) the free energy change $\Delta F_0 = -61{,}938$. Substituting this value in Equations (7) and (6), according to the principles expressed in my United States Patent No. 2,110,066, the oxygen activity at 1400° C. can be calculated to be $$(A_{O_2})^{\frac{1}{2}} = 8.2 \times 10^{-9}$$

assuming the activity of both carbon and carbon monoxide to be unity. Where carbon is the reducing agent, it is desired that the activity of carbon monoxide shall be less than unity and this desirable condition is obtained by diminishing the pressure of the reacting pig iron and slag below the normal atmospheric pressure of 760 millimeters of mercury. This pressure may be reduced, for example, to approximately 76 millimeters of mercury, thereby reducing the activity of carbon monoxide to approximately one-tenth of its former value. By so doing, the former value of $$(A_{O_2})^{\frac{1}{2}}$$

as calculated from Equations (6) and (7) is reduced from $8.2 \times 10^{-9}$ to $8.2 \times 10^{-10}$.

If, for the purpose of illustration, it be assumed as in United States Patent No. 2,110,066, that it is desired to desulphurize pig iron until the sulphur activity reaches a point at which $$(A_{S_2})^{\frac{1}{2}} = 10^{-5}$$

Equation (4) may be solved using this value of $$(A_{S_2})^{\frac{1}{2}}$$

and the previously determined value of $$(A_{O_2})^{\frac{1}{2}} = 8.2 \times 10^{-9}$$

for 760 millimeters of mercury pressure, thus:

$$\frac{(A_{R_xS}) \cdot (8.2 \times 10^{-9})}{(A_{R_xO}) \cdot (10^{-5})} = K_2 \qquad (9)$$

$$\frac{(A_{R_xS})}{(A_{R_xO})} = (1.2 \times 10^3) K_2 \qquad (10)$$

$$(A_{R_xS}) = (1.2 \times 10^3)(A_{R_xO}) K_2 \qquad (11)$$

In the present invention, using the illustration previously described for 76 millimeters of mercury pressure where $(A_{O_2})^{\frac{1}{2}} = 8.2 \times 10^{-10}$, Equation (11) becomes $$(A_{R_xS}) = (1.2 \times 10^4)(A_{R_xO}) K_2 \qquad (12)$$

The value of $$(A_{R_xS})$$

is a measure of the concentration or percentage of $R_xS$ in the desulphurizing slag. From Equation (12) it is evident that as the pressure on the slag and pig iron falls below the normal atmospheric pressure of 760 millimeters of mercury, the value of $$(A_{R_xS})$$

rises proportionally. Thus for a pressure of 76 millimeters of mercury, the lowering of pressure to one-tenth normal atmospheric pressure causes $$(A_{R_xS})$$

to be increased ten times. It is therefore very advantageous to submit the desulphurizing slag and pig iron to a pressure less than atmospheric so that the desulphurizing action is intensified.

The amount of the diminished pressure will depend upon the slag chosen and other conditions now to be discussed. For most economical desulphurization it is desirable to have a high ratio of sulphur in the slag to sulphur in the pig iron, that is, a high percentage of $R_xS$ in the slag when desulphurization is finished. This is accomplished by keeping the product $$(A_{R_xO}) K_2$$

high through choice of a slag of proper chemical composition, and by keeping the pressure on the slag as far below atmospheric pressure as is practical and economical. At this point it is interesting to note that the conditions attending the desulphurization of pig iron in the blast furnace hearth are not particularly favorable because the pressure is as much as 760 millimeters of mercury or more above atmospheric pressure.

Slags

As a choice of desulphurizing slag, it is preferred to illustrate by a slag whose active desulphurizing oxide is CaO. It has previously been explained that other alkaline earths or alkali oxides can be used. The inventor has found, however, that CaO is a very desirable and economical desulphurizing agent and it is used in the illustrations, but it will be evident that the other oxides described above could be used in a similar manner after proper allowance is made for slight variations in the chemical and physical properties of the other oxides.

CaO in the pure state has a high melting point (2570° C.). It is conventional to reduce the melting point of CaO to form readily fusible slags by adding $SiO_2$ and perhaps $Al_2O_3$ and other oxides. Thus, for example, it is possible to form a slag which is free-flowing at 1400° C. having the approximate composition:

|  | Per cent |
|---|---|
| CaO | 44 |
| MgO | 4 |
| $Al_2O_3$ | 15 |
| $SiO_2$ | 37 |

In such a slag the activity of the lime is reduced by the presence of 37% silica and 15% alumina. Slags of this approximate composition are used as desulphurizing agents in the blast furnace and are capable of building up a 60:1 ratio of the percentage of sulphur in the slag to the percentage of sulphur in the pig iron. It has been found that such a slag can be used in the present invention, especially if the slag and pig iron to be desulphurized are subjected to a diminished pressure of 150 millimeters of mercury or less, thereby causing the sulphur ratio to rise to 100:1 or 200:1 or more depending upon specific conditions.

If ordinary blast furnace slag is used, it may desirably be mixed with say 5% to 10% or more by weight of fluorspar and, if desired, up to 20% or more by weight of burned lime or substances high in CaO such as burned dolomite or dolomitic lime. About 2% of lime is the minimum lime addition that would be substantial in effect. A typical mixture might consist of 70% blast furnace slag, 10% fluorspar, 20% lime. Such a slag when held in contact with pig iron of high sulphur content (0.16% S) at 1400° C. in a non-oxidizing atmosphere, at normal pressure, reduced the sulphur content of the iron to 0.015% S and the slag increased its sulphur content to 2.66%. A similar slag under an absolute pressure of 35 millimeters of mercury reduced the sulphur content of the iron to 0.001% and the slag contained 2.83% sulphur.

Blast furnace slag mixed with lime and/or fluorspar as just explained, may be employed in any of the forms of the invention disclosed herein, whether the reducing agent be carbon at atmospheric pressure or at reduced pressure, or a metallic reducing agent such as aluminum, magnesium or calcium as later explained. Where carbon is the reducing agent, it may in some places be supplied by the carbon dissolved in the pig iron, which normally contains more than 2% of carbon, and in other cases this dissolved carbon may be supplemented by a carbon lining in the reaction vessel and/or by loose carbon added to the reaction vessel.

The $SiO_2$ content of the desulphurizing slag can also be further decreased and slags have been synthesized containing as little as 15% $SiO_2$ or less, as for example using a mixture of 40 parts blast furnace slag, 30 parts fluorspar, 30 parts lime, which slag would contain about 12% $SiO_2$. It has been found that such slags are very advantageous especially where the slag and pig iron under treatment cannot be subjected to low pressures.

A desulphurizing slag having the composition:

|  | Per cent |
|---|---|
| CaO | 45 |
| $CaF_2$ | 40 |
| $SiO_2$ | 15 | has also been found to be very satisfactory. Such a slag can be readily synthesized by mixing lime and fluorspar of commercial grade, adjusting the silica to the desired percentage by the addition of silica sand, after allowing for the silica present as impurity in the lime and fluorspar. Magnesia present as a normal impurity in a good grade of lime is not objectionable. Alumina present as a small amount of impurity is also not objectionable. Indeed the addition of approximately 5% of alumina seems to be advantageous as it reduces somewhat the melting point of the desulphurizing slag. The above slag flows freely at 1200° C. and this property is very desirable for efficient desulphurization.

Molten pig iron high in sulphur (0.25%) has been subjected to the action of the lime-fluorspar-silica slag above referred to at 1400° C. for one hour at atmospheric pressure in a refractory container composed of carbon in the form of graphite. The slag and molten pig iron were under strong reducing conditions and the desulphurizing vessel was arranged so as to prevent direct contact with the atmosphere or with combustion gases high in oxygen, carbon dioxide or water. Under these conditions the slag picked up as much as 10.79% sulphur, and the pig iron had its sulphur content reduced to 0.03% sulphur, so that there was more than one hundred times as high a percentage of sulphur in the slag as in the pig iron. In other cases in which the pig iron initially contained only about 0.03% sulphur, the sulphur content of the pig iron was reduced to 0.002% sulphur and the slag picked up 0.11% sulphur.

These good desulphurizing results can be still further improved if the pressure on the slag is reduced, for example to 380 millimeters of mercury, or below. It is to be noted, however, that low pressures such as 30 millimeters of mercury are not to be recommended with slags rich in fluorspar unless adequate means are provided to take care of the volatile products which such slags give off at low pressures. The sulphur content of the iron may be reduced to less than one-half, or less than one-quarter, or even less than one-tenth of that in the iron before treatment according to the invention.

A study has been made of the use of soda as a substitute for lime in desulphurizing slags. The desulphurizing action of soda, for example sodium carbonate, on pig iron is well known and this alternative can be used. It is found, however, that pure soda is readily attacked by carbon at temperatures of 1400° C. or even below producing sodium vapor which is very effective in converting FeS into Na₂S and thus desulphurizing the pig iron. The sodium vapor causes difficulty in the handling of soda slags, and the reaction must be managed in such a way as to limit the formation of volatile soda derivatives in order to avoid excessive loss as fume. It is possible to use slags containing Na₂O, SiO₂ and Al₂O₃ with other oxides to overcome volatilization loss incident to sodium carbonate. Furthermore the revivification of soda slags to remove sulphur and permit reuse presents special difficulties not present in the case of lime slags.

Detailed reference to the steps necessary when soda slags are used is therefore omitted, and the further discussion is generally confined to slags containing alkaline earth oxides as the preponderant active constituents. However, the use of slags containing soda or other alkali metal oxides as active desulphurizing ingredients, when used as substitutes for alkaline earth oxides such as lime as active ingredients, is included herein.

The quantity of oxides of the type $R_xO$ in the initial slag should exceed 30% for best results.

Due to the cheapness and freedom from volatilization, it is preferable to use a lime slag, although such preference is subject to change under varying economic and metallurgical conditions.

In choosing the slag, it is desirable to have one which will be of low viscosity and workable at temperatures of 1400° C., and for this purpose, the slag should preferably be freely fluid at as low as 1200° C. or in some cases at 1300° C.

It is very advantageous to use a slag which shows a high ratio of sulphur concentration in the slag after use to sulphur concentration in the desulphurized or partially desulphurized pig iron. If, for example, 0.25% sulphur must be removed from the pig iron and if the slag will take up as much as 12.5% sulphur, then one ton of slag will desulphurize 50 tons of pig iron. It is to be noted that an ordinary coke blast furnace slag can absorb approximately 1.75% sulphur and reduce pig iron to as low as 0.03% sulphur under a pressure as much as 760° millimeters of mercury above atmospheric. It has been found that such an ordinary blast furnace slag when subjected under proper conditions to approximately one-tenth normal atmospheric pressure (for example 76 millimeters of mercury pressure), becomes capable of absorbing 6% of sulphur or more and can thereby reduce a high sulphur iron to 0.03% or less. In such a case the ratio of sulphur percentage in the slag to sulphur percentage in the molten pig iron equals or exceeds 200:1.

Thus by the use of diminished pressure it is possible to improve the desulphurizing power of the special synthetic slags such as the one described above containing 45% CaO, 40% CaF₂, 15% SiO₂, or to improve the desulphurizing power of ordinary blast furnace slags or similar slags of poorer desulphurizing ability to the point where they may be substituted for the special synthetic slags. If slags produced in a blast furnace are to be used, the addition of approximately 5% to 10% of fluorspar and say 20% of burned lime is advantageous, as already noted.

It is obvious that the composition of the slag and the diminished pressure to be used should be chosen to meet the individual case under consideration. Much latitude is offered in the choice of these two factors as is shown by Equations (4) and (12). In general these factor of slag composition and pressure should be chosen so that a ratio of sulphur in the slag to sulphur in the iron should exceed 100:1 and preferably exceed 200:1.

As explained in detail below, it is often advantageous to employ a desulphurizing slag which can be revivified or treated to remove its sulphur so that it can be used over and over again. The lime slags referred to fulfill this requirement. The desulphurizing slag, after it has picked up, for example, 12% sulphur, is revivified by removing sulphur from the slag until, for example, less than 1% sulphur remains. This revivified slag is then used repeatedly to desulphurize further quantities of molten pig iron.

Desulphurization

The pig iron used in the process will in most cases be pig iron produced in the coke blast furnace when operated under conditions of moderate temperature and moderate basicity of the slag suitable to produce pig iron at lower cost but with a higher sulphur content than that ultimately desired. The sulphur content of the pig iron produced in the coke blast furnace under such economical conditions may be 0.25%, 0.3% or even higher. Of course the invention may also be applied to pig iron of normal sulphur content, containing say 0.04% S. The pig iron to be desulphurized is brought into contact with the desulphurizing slag under the proper conditions. For example the desulphurizing slag can first be charged into a ladle or other vessel and the molten iron can then be added. If the desulphurizing slag is to contain blast furnace slag, such blast furnace slag can be obtained molten if desired from the blast furnace. The necessary lime and fluorspar can be added to the molten blast furnace slag and the entire mixture made molten by additional heat before the iron is added if desired. Or the lime and fluorspar can be added in solid form to the desulphurizing vessel either before, during or after the addition of the iron. In order to obtain intimate mixing of iron and desulphurizing slag, the slag should be molten and of low viscosity before much of the iron is added.

The actual desulphurization may, for example, be carried out in a vessel such as that shown in the drawings, which illustrate a ladle car of the general type disclosed in Pugh's United States Patent No. 1,534,187, granted April 21, 1925. The ladle car of Figures 1 to 4 comprises a ladle body 20, covered with a metallic casing 21 having a cylindrical central portion 22 and conical end portions 23 and 24 which terminate in headers 25 and 26. The headers support trunnions 27, 27', 27² and 27³, which engage bearings 28, 28', 28² and 28³. The bearings 28, 28', 28² and 28³ are supported from a main frame 29, which in turn rests upon any suitable railway trucks 30 and 31, operating upon a track 32.

To permit tilting or rocking of the ladle car, the main frame 29 is bowed at 33. The hook of a crane may be engaged with the main frame, as at 34, to lift one side of the main frame, causing trunnions 27' to leave bearings 28' and eventually causing trunnions 27³ to engage bearings 28³. Lifting and lowering at 34' might also be used. The lifting and lowering of one side of the main frame may be used to agitate the liquid contents of the ladle car, and the lifting and lowering at 34 may also be used in tapping the ladle car.

The means of rocking and tilting the ladle car need not be that shown, as any other suitable means may be employed. For example, the reaction vessel of the ladle car may be rotated by a conventional driving band and motor as shown, for example, in Hart's United States Patent No. 1,916,170, granted June 27, 1933.

Inside the casing 21 is a lining 35 of suitable refractory material. It is contemplated that this will normally be graphite, or other suitable carbon refractory, although any other suitable lining material, such as magnesite or fire-clay brick, for example, might be used. If carbon be used as a lining, it may be rammed in place with a binder or built into the desired form from blocks which have previously been formed. These blocks may be made by pressing under high pressure about 50 parts of calcined anthracite coal passing 6 mesh per linear inch and large enough to rest on 20 mesh per linear inch with 40 parts of coke ground to pass 50 mesh and 10 parts of high melting point asphalt or coal tar ground to pass 50 mesh. This mixture should preferably be mixed with water and about 5% of sodium silicate. The mixture after molding can be dried to a hard strong mass suitable for use without firing. Of course the mixture can be fired before use if desired. In such case the sodium silicate and water can be omitted, the mass being pressed hot to effect a bond due to the tar or asphalt present.

Inlet to the ladle car is provided through a charging opening 36, from a runner or launder 37 of a coke blast furnace 38. The charging opening may be closed by a door 39 which makes a gas-tight seal through gasket 40 between flanges 41 and 42.

The discharge of slag from the ladle car is facilitated by a pouring spout 43 below the charging inlet. When the pouring spout is used, the ladle car will be tilted, and the pouring spout will normally be closed when not in use by a plug 44 and a door 45 making a gas-tight seal through gasket 46 between flanges 47 and 48. Gas-tight inspection doors may be provided if desired. The ladle car is provided with a connection 49 leading to a suitable pump 49' for maintaining the desired pressure below the normal atmospheric pressure.

An atmosphere of reducing gas, primarily carbon monoxide, under a pressure below atmospheric pressure is maintained in the vessel by the pumps. The carbon monoxide comes from the reaction of any oxidizing substances with carbon present. In order to maintain this pressure the entire steel shell of the ladle and all openings are made gas tight.

It is not ordinarily necessary to heat the ladle car, as the pig iron will normally have sufficient superheat from the blast furnace to keep the contents of the desulphurizing vessel molten and to melt the desulphurizing slag when it is not charged molten. For the purpose of illustrating diagrammatically that any suitable noncontaminating heating means may be applied to the ladle car, electrodes 50 are shown in Figure 4a (one set only being visible in this figure), intended to be connected to a suitable source of electrical energy to supply arc heating. No attempt in the illustration has been made to show either electrical insulation or protection against air leakage about or for the electrodes as both insulation and closure against leakage may be taken care of in various well recognized ways. In fact the leakage incident to the electrodes need not be taken care of as the electrodes and the covers carrying them may be replaced by gas-tight doors after heating and before applying vacuum.

In order to avoid the necessity of bolting or otherwise fastening the cover on the desulphurizing vessel, constructions as shown in Figures 5 and 6 may be used, in which co-operating curved surfaces are provided on the cover and on the neck of the vessel, and some plastic sealing means employed.

In Figure 5 the lower surface of the cover 39' is spherical and convex at 51. The neck 52 of the desulphurizing vessel has a convex circular lip 53 which cooperates with the spherical surface 51 on the cover, the surfaces 51 and 53 meeting as at 54. The space 55 between the diverging curves of the cover and the lip is filled with any suitable luting, such as clay or other plastic sealing material. As vacuum is applied through the pipe 49, the pressure of the atmosphere tends to maintain the cover 39' in position, and the atmosphere also tends to force the luting firmly against the surfaces 53 and 51.

Figure 6 shows a variation of the sealing arrangement of Figure 5. The cover $39^2$ is of general cap form with a spherical surface at 51' which contacts an annular shoulder 53' on the casing of the ladle. Luting is provided at 55' to fill the space between the diverging surfaces 51' and 53'. As in the form of Figure 5, the pressure of the atmosphere tends to hold the cover and the luting in place as vacuum is applied through pipe 49. The vessel of Figure 6 is taller in cross-section than that of Figure 3, this making it easier to pour in the vessel of Figure 6, at 56 through the top opening, since a greater angle of turning is possible before pouring of a given charge need start.

An illustrative cycle of operations is as follows. The ladle car containing about 2.5 tons of molten desulphurizing slag, preferably slag which has previously been used to desulphurize a previous charge of molten pig iron, is filled with about 100 tons of molten pig iron from the coke blast furnace flowing through the blast furnace runner 37, and containing as much as about 0.3% sulphur or more (say 0.26% sulphur). The molten slag is held in contact with the molten iron under the proper diminished pressure for as much as one hour or more until the sulphur content of the molten pig iron has fallen to between about 0.03% sulphur and 0.10% sulphur (say 0.05% sulphur) and the sulphur in the slag has increased to perhaps 5% sulphur or a much higher figure (say 10.8% sulphur). With good operating conditions and efficient slags, as much as 12% sulphur can be built up in the slag with only 0.04% or 0.05% sulphur in the pig iron. It is desirable to have a high concentration of sulphur in the slag when the slag is to be revivified since the amount of slag necessary is thereby reduced.

At this stage the slag is then removed from the ladle car by the pouring spout 43.

In the preferred process about 2.5 tons of a second slag similar in composition to the first slag are now added, and further desulphurization of the molten pig iron is accomplished.

The pig iron and slag are maintained in contact with one another preferably for an additional hour or more under the proper diminished pressure, and the sulphur content of the pig iron may thereby be reduced to 0.015% sulphur, 0.01% sulphur or even less if desired. The sulphur content of the second slag may increase from a negligible quantity at the time it is charged to 1% sulphur or 2% sulphur or more. The molten iron is then separated from the second slag, as by tapping the second slag, then removing the molten iron, and then pouring back the second slag into the ladle car, or by retaining the molten slag in the ladle car during tapping of the iron, for example by submerging the pouring opening below the slag level before removing the plug from the pouring opening and then retaining the slag level above the pouring opening during pouring from the ladle car.

The ladle car is then returned to a source of high sulphur pig iron to receive a further charge of say 100 tons, and the further charge is desulphurized by a first treatment with the slag which was used as the second slag on the previous charge, by removal of the high sulphur slag produced thereby, by addition of fresh slag and so on.

It will of course be understood that a stationary ladle, mixer or furnace can be employed, if it is suitably equipped.

If a mixer be used as shown in Figure 7, a large amount of liquid desulphurizing slag 57 as for example a layer 3 to 15 inches deep desirably mixed with carbon 59 could be maintained in contact with the iron 58. Periodic additions of iron and slag could be made. Removal of desulphurized iron would take place by depressing the tapping opening 60 below the slag level as by tilting the mixer through mechanism 61 and then allowing molten pig iron to flow out through the tap hole 60 while retaining the slag above the iron level within the mixer. The tap hole should preferably be plugged with clay which may be drilled out to permit the iron flow. Removal of the slag may be done periodically. Preferably only a part of the total slag volume should be removed at one time. If desired a separate tap hole 60' for slag removal is provided. A usual charging opening 62 closed by an air-tight cover 63 and a customary pouring spout 64 closed by an air-tight cover 65 are shown. The slag from the mixer can be thrown away or can be revivified for use in other metallurgical processes or can be poured into the transfer ladle cars used for bringing the high sulphur iron from the blast furnace to the mixer. In the latter case the high sulphur iron will be considerably purified before entering the mixer.

The amount of slag required per ton of pig iron desulphurized will depend on the amount of sulphur to be removed from the pig iron and the amount of sulphur picked up by the slag. If, for example, a high sulphur pig iron containing 0.26% sulphur is desulphurized to 0.015% sulphur, then, for every 100 tons of pig iron, 0.245 tons of sulphur must be taken up by the slag. If the slag picks up 9.8% sulphur, 2.5 tons of slag will be necessary to treat 100 tons of pig iron.

In desulphurizing high sulphur pig iron, a stepwise process as described above is quite efficient since it removes the sulphur with a small amount of slag, and necessitates regeneration of a smaller amount of slag for further desulphurization. For efficient desulphurization the ratio of sulphur percentage in the slag to sulphur percentage in the pig iron may be as much as 250:1 or even a higher ratio. Thus a desulphurizing slag in contact with molten pig iron having 0.015% sulphur might have picked up 2.5% sulphur from the pig iron.

If 100 tons of iron were being treated to remove 0.25 tons of sulphur, 10 tons of slag might be needed if the desulphurization were done in a single step.

If the pig iron were desulphurized in a stepwise process, reducing the sulphur first to about 0.05% sulphur and separating a sulphur-rich slag containing 10.8% sulphur, then adding a second and fresh slag to remove the balance of the sulphur in the iron down to 0.015% sulphur, then separating the iron from the second slag containing about 2.4% sulphur for use in the preliminary treatment of the next charge of sulphur-rich pig iron as above described, the removal of 0.245 tons of sulphur from 100 tons of iron can be accomplished with only 2.5 tons of slag, although 3.5 tons of slag, or more, may be used.

By stepwise treatment it is possible to reduce the sulphur content of molten pig iron from a value in excess of 0.10%, say 0.3%, to less than 0.01%, in one or two hours, by slags which aggregate less than 8% and generally not more than 5% of the weight of the pig iron.

The stepwise process of desulphurizing pig iron is not necessary however in all cases. For example, if a desulphurizing slag composed of approximately 70% molten blast furnace slag, 10% fluorspar and 20% burned lime is used, especially if used under reduced pressure, the pig iron may be properly purified with a limited amount of slag and slag expense without the stepwise treatment. One form of such treatment would involve the addition to the ladle of the required amount of molten blast furnace slag, fluorspar, lime and pig iron. The desulphurization may then be effected using preferably a reduced pressure. After the necessary purification has been effected the slag may be removed from the pig iron and discarded or revivified as desired.

In this example 100 tons of molten pig iron and 2.8 tons of molten slag are withdrawn from the blast furnace into a ladle preferably of the type shown in Figures 1 to 3. To the ladle is added 0.4 ton of fluorspar and 0.8 ton of burned lime. Carbon also is desirably added, although the carbon in the pig iron and in the carbon lining are ordinarily sufficient. The ladle is sealed and connected to the vacuum pump, the pressure being preferably less than 380 millimeters of mercury, and very desirably less than 76 millimeters of mercury.

For best results the slag used should be very liquid at the temperature prevailing. It was found that 1400° C. was an economical and desirable temperature, although higher or lower temperatures may be used. If the slag flows freely at 1200° C., it will of course be very liquid at 1400° C.

In the case of a lime slag, sulphur is retained in the slag as calcium sulphide. Iron sulphide present in the iron phase dissociates:

$$FeS \rightarrow Fe + \tfrac{1}{2}S_2 \qquad (1)$$

The sulphur reacts with the lime or other $R_xO$ oxide of the slag thus:

$$CaO + \tfrac{1}{2}S_2 \rightarrow CaS + \tfrac{1}{2}O_2 \qquad (13)$$

To drive the above reaction to the right and desulphurize the pig iron it is necessary to keep the oxygen activity low by reducing agents. The high carbon content of the pig iron itself has some reducing action, and it is decidedly preferable to desulphurize the iron while it still has its pig iron carbon content to aid in reduction than at a later stage when its carbon content has been lowered, for example to that of steel. In many cases the carbon content of the pig iron itself will serve to maintain reducing conditions when air, carbon dioxide, carbon monoxide and water are excluded.

It is desirable to employ a carbon lining in the ladle car, and this serves to assist materially in maintaining reducing conditions. It is also very desirable where a carbon lining is used, and much more desirable where a carbon lining is not used, to introduce coke or charcoal into the slag, maintaining a substantial body of carbon floating on the molten pig iron. In the slag 57 floating on the molten pig iron 58 carbon is seen at 59.

When the removal of sulphur under vacuum conditions has been accomplished and before the vacuum has been released, i. e., before opportunity for resumption of normal atmospheric conditions in the desulphurizing vessel, it is desirable to insert a protecting gas under atmospheric pressure and free from contaminating quantities of oxygen, carbon dioxide, carbon monoxide and water vapor—for example nitrogen. If a gas, so free from contamination, be admitted under atmospheric pressure to fill up the space, resulphurization of the pig iron will be prevented during the short interval while the slag is being separated from the iron.

Reducing agents other than carbon may be used to remove the oxygen in reaction (3) provided a sufficiently low activity of oxygen is obtained. The lower the oxygen activity, the higher the possible ratio of the percentage of sulphur in the slag to the percentage of sulphur in the iron at the end of the desulphurization, the more complete the desulphurization and the more rapid the reaction. Metallic aluminum, for example, is considered to react with oxygen in the following manner:

$$2Al + 3/2 O_2 \rightarrow Al_2O_3 \quad (14)$$

For reaction (14), under equilibrium conditions at 1400° C. the oxygen activity $(A_{O_2})$ is considered to be less than $10^{-22}$, or

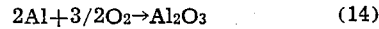

less than $10^{-11}$. In Equations (9) and (12) the oxygen activity was considered as respectively $$(A_{O_2})^{\frac{1}{2}} = 8.2 \times 10^{-9}$$

and $$(A_{O_2})^{\frac{1}{2}} = 8.2 \times 10^{-10}$$

Thus it is possible to obtain suitably low oxygen activity by adding metallic aluminum to the reacting slag-metal phases. If the aluminum be added to the molten iron it will dissolve in the iron. In order to economize in the amount of aluminum required, a dilute solution of aluminum in the pig iron is recommended. As this aluminum content is made more dilute, however, the reducing power of the aluminum in the solution falls. It appears that aluminum in amounts of 0.05% by weight yields a desirably strong reducing condition. Concentrations smaller than this can be used depending upon the degree of desulphurization required. Amounts in excess of 0.05% may be used if the cost is not considered objectionable. For each 32 parts by weight of sulphur to be removed from the iron, approximately 18 parts by weight of aluminum are required for the reaction:

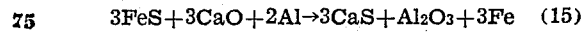

In order to keep the consumption of aluminum to a minimum, the initial stage of the desulphurization can be brought about using carbon or other reducing agents, followed by the addition of aluminum to complete the final stage of desulphurization.

Metallic magnesium and calcium have the ability to combine with oxygen to produce very low oxygen activity comparable to that of aluminum. Silicon and manganese have reducing properties but the activity of oxygen which they produce, especially when used in the form of their ferro-alloys, is much higher than that of aluminum, magnesium or calcium. Other reducing elements or substances may be substituted for the elements described above.

The plan of using carbon as a reducing agent during the initial stages and employing a metallic reducing agent during the more advanced stages of the desulphurization may be applied with any of the metallic reducing agents. The carbon for the initial stages of the reaction may be supplied by the carbon dissolved in the pig iron in some cases, or by a carbon lining and/or loose carbon added to the reaction vessel, whether the reaction is carried out at atmospheric pressure or at reduced pressure. After the initial stage of the reaction, the metallic reducing agent, for example aluminum, may be added, thus cutting down greatly on the consumption of metallic reducing agent. Reduced pressure may be used in the more advanced stage, also, to accentuate the desulphurization action due to the carbon reducing agent present dissolved in the pig iron, or forming the carbon lining or added loose in the reaction vessel.

In cases where reducing agents such as metallic aluminum, magnesium or calcium are used, this invention teaches the use of a protecting atmosphere, suitably introduced as through the connections $49^2$ and 49, and surrounding the reacting metal-slag phases to positively exclude oxidizing gases in order to obtain low oxygen activities. In this connection the use of nitrogen as a protecting atmosphere is recommended. Carbon dioxide may be considered too oxidizing for good results under the conditions of time, temperature and pressure etc. present. Even carbon monoxide in high concentration may in individual cases react with metallic aluminum, etc., to decrease the efficiency of desulphurization

This reaction of metallic aluminum in a steel bath is well known and to it are attributed the "degasifying" abilities of aluminum when added to steel.

The gas used in excluding the atmosphere should have a low oxygen activity. Where a metallic reducing agent is employed, the protecting gas should be of such composition as will provide an oxygen activity in the reacting slag and metal substantially lower than that obtainable by the reaction at atmospheric pressure between carbon and oxygen to form carbon monoxide under equilibrium conditions at the pig iron temperature.

It will thus be evident that by the present invention it is possible to accentuate the desulphurization by obtaining an oxygen activity in the reacting phase substantially lower than that obtainable by the reaction at atmospheric pressure between carbon and oxygen to form carbon monoxide under equilibrium conditions at the pig iron temperature. The square root of the oxygen activity at 1400° C. should ordinarily be substantially lower than $8.2 \times 10^{-9}$. Where carbon is the reducing agent, this low oxygen activity can be obtained by excluding the atmosphere and applying a pressure below atmospheric pressure. Where a metallic reducing agent is to be used instead of carbon, the choice of a reducing agent, such as metallic aluminum, magnesium or calcium, and the exclusion of the atmosphere by the use of a protecting gas, insures attainment of the required low oxygen activity in the reaction vessel.

To facilitate the desulphurization, agitation of the metal and slag may be used. Such agitation may be produced by rocking or rotating the ladle car, by raising and lowering one end of the ladle car, etc.

The desulphurized pig iron from the ladle car may be used in any form in which the pig iron is suitably employed, as for example for gray iron or malleablized castings, etc. It is contemplated, however, that a large part of the desulphurized pig iron will be used in steel-making furnaces for the production of steel in much the same manner that the conventional low sulphur product of the coke blast furnace is now used.

Where steel is made, the economy in production of the raw material will effect an over-all economy in the steel process. A further important advantage in steel making is that it will in no case be necessary to take any precautions in steel making to eliminate sulphur, as is sometimes necessary when the blast furnace pig iron runs excessively high in sulphur. This is of especial importance in the manufacture of electric steel, in which case sulphur elimination takes a substantial part of the time and contributes to the cost. Nor will it be necessary to reject certain ores or coke on account of the sulphur content when smelting pig iron for steel-making purposes.

The detail of the refining of the pig iron to make steel is not part of this invention, and the desulphurized pig iron may be used in the acid or basic open hearth, the electric furnace, the Bessemer converter or in any other suitable manner to produce steel.

*Revivification*

It has been previously explained that a wide choice of desulphurizing slags is accorded in this invention, and that special slags containing high percentages of fluorspar or other expensive components may be used.

To utilize these expensive slags economically the inventor proposes to revivify the spent slags and use them over and over again. In many cases, however, a special slag may not be required. For example, let us consider the desulphurization of a pig iron containing about 0.10% S. One hundred tons of such pig iron could be charged into the mixer ladle with approximately 4.5 tons of molten slag taken simultaneously from the blast furnace. If desired 0.5 ton of fluorspar could be charged. The slag and pig iron could be maintained for example under a pressure of 76 millimeters of mercury for one hour or more. Under such conditions the sulphur in the iron would be reduced to less than 0.025% (for example to 0.02%). Such reduction would require the 5.0 tons of initial slag to absorb 0.08% of 100 tons or 0.08 ton of sulphur, the equivalent of 1.6% sulphur in the slag.

Since the initial slag above was obtained from a blast furnace it may have contained initially about 1.5% sulphur. Thus the final slag would contain 1.5% plus 1.6% or 3.1% sulphur. This condition would require a ratio of the percentage of sulphur in the slag to the percentage of sulphur in the iron of 155:1. After desulphurization, the molten iron could be tapped from the ladle before the slag, or the slag could be separated first. In separating slag and metal it is desirable to avoid any excessive oxidation whilst the slag and metal are in contact since this will cause sulphur to leave the slag and reenter the metal. Similarly, after the desulphurization is completed it is desirable to separate slag and metal as soon as possible after the pressure has been restored to normal atmospheric pressure.

In this last illustration the desulphurizing slag need not be revivified for use over again since fresh quantities of molten blast furnace slag could be obtained more cheaply than the used slag could be revivified.

The choice as to whether special slags should be used or whether the cheaper blast furnace or similar slags will suffice will depend upon individual conditions, the sulphur contents of the initial and final iron, the cost of revivification, etc.

The details of revivification are explained in the Heuer patents and applications above referred to, which are incorporated herein by reference.

It is contemplated that there will be certain losses of slag during the desulphurizing process, and that certain small amounts of impurities may be picked up, both of which features will necessitate additions of fresh slag-making materials from time to time. By the use of proper refractories in the ladle car, and by the maintenance of reducing conditions when the slag is in contact with the molten pig iron, the fresh slag-making materials required can be kept to a minimum in order to effect, to the fullest extent, the economies made possible by repeated use of the slag.

Numerous examples have been given herein to aid in practicing the invention. It is not intended, however, to limit the disclosure by reason of the inclusion of these examples except where limitations are included in the claims or indicated by the specification to be essential.

Where reference is made herein to atmospheric pressure, it is intended to designate the prevailing atmospheric pressure.

It will be evident that, by exposing the pig iron to the desulphurizing slag under a pressure below atmospheric pressure for a sufficient duration, a higher ratio between the sulphur in the slag and the sulphur in the pig iron can be built up than would be obtained with the same slag under atmospheric pressure. Thus under reduced pressure the same desulphurization may be obtained with a smaller quantity of slag than under atmospheric pressure, or under reduced pressure more complete desulphurization may be obtained than under atmospheric pressure with the same quantity of slag, or desulphurization may be obtained under reduced pressure with a slag which would not desulphurize or might even sulphurize under atmospheric pressure.

It will also be evident that the rate of desulphurization by a given slag is increased where the pressure is reduced below atmospheric pressure, so that the time required to produce a given desulphurization is lowered with respect to the time required at atmospheric pressure. Thus in many instances a desulphurization slag under reduced pressure will build up a higher ratio of sulphur in the slag to sulphur in the pig iron in about the same time that it would build up a lower and maximum ratio under atmospheric pressure.

It will also be evident that, when a metallic reducing agent is used, the contents of the reaction vessel may be protected from the atmosphere by a suitable gas, or the reaction vessel may be maintained under reduced pressure to accentuate the reduction for the carbon present and supplement the action of the metallic reducing agent.

In view of my invention and disclosure, variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. In apparatus for producing desulphurized pig iron, a desulphurizing vessel having a carbon lining in the portion which is to hold a charge, a basic desulphurizing slag within the lining of the desulphurizing vessel, means for sealing the interior of the desulphurizing vessel from the outside atmosphere and means for producing and maintaining a pressure substantially below atmospheric pressure in the interior of the desulphurizing vessel.

2. In apparatus for producing desulphurized pig iron, a hot metal car having a carbon lining in the portion which is to hold a charge and having a charging opening and a tap opening in an otherwise gas-tight exterior of the car, a basic desulphurizing slag within the lining of the car, means for sealing the charging opening and the tap opening and thereby closing the interior of the car against ingress of the atmosphere and means for producing and maintaining a pressure substantially below atmospheric pressure in the interior of the car.

3. In apparatus for producing desulphurized pig iron, a desulphurizing vessel having a carbon lining in the portion which is to hold a molten content, a basic desulphurizing slag within the lining of the desulphurizing vessel, means for sealing the interior of the desulphurizing vessel from the outside atmosphere, means for agitating the molten content of the vessel while it is closed from the atmosphere and means for producing and maintaining a pressure substantially below atmospheric pressure in the interior of the desulphurizing vessel.

4. In apparatus for producing desulphurized pig iron, a desulphurizing vessel having a carbon lining in the portion which is to hold a charge and having an opening for access to the interior of the vessel, blast furnace slag within the lining of the desulphurizing vessel, means for closing the opening and rendering the vessel gas-tight to the outside atmosphere, and means for maintaining a pressure substantially below atmospheric pressure in the interior of the vessel.

5. A vessel for desulphurizing pig iron having an opening for communication with the interior, a refractory lining in the vessel for holding a pig iron charge, means communicating with the interior of the vessel for maintaining the pressure within the vessel below atmospheric pressure, a closure for the opening engaging adjacent the edges of the opening to form annular divergent surfaces and luting occupying the space formed by the annular divergent surfaces and sealing the closure against ingress of air.

RUSSELL PEARCE HEUER.